Figure 1:
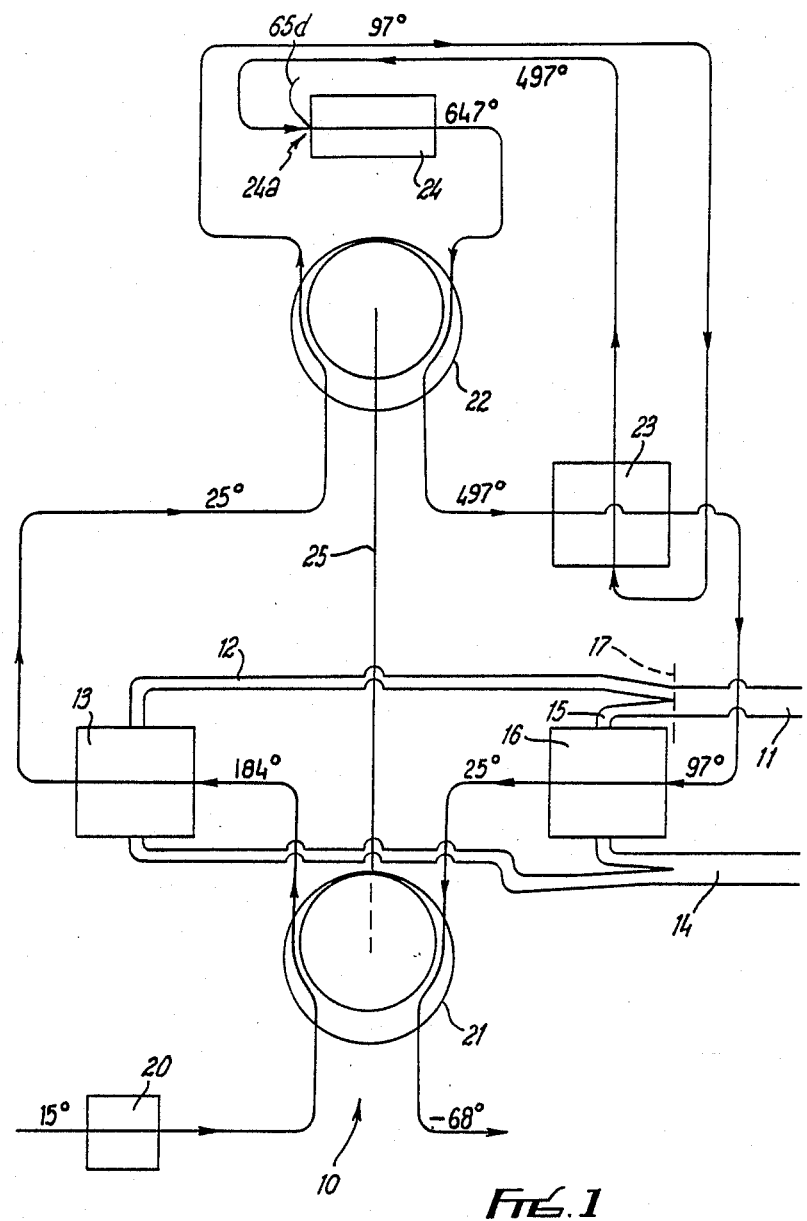

United States Patent [19]

Driver

[11] Patent Number: 4,831,827
[45] Date of Patent: May 23, 1989

[54] HEAT TRANSFER SYSTEMS
[75] Inventor: Ronald W. Driver, Clitheroe, England
[73] Assignee: Robert Maurice Ward, Skipton, England; a part interest
[21] Appl. No.: 55,517
[22] Filed: May 29, 1987
[30] Foreign Application Priority Data
  Jun. 3, 1986 [GB] United Kingdom ............... 8613414
[51] Int. Cl.$^4$ .............................................. F01K 7/22
[52] U.S. Cl. .................................... 60/679; 60/682; 237/12.1
[58] Field of Search .............. 60/648, 650, 682, 685, 60/690, 698, 39.25, 39.43, 679; 62/238.4; 237/12.1

[56] References Cited

U.S. PATENT DOCUMENTS 3,293,850 12/1966 Morrison ............................ 60/648
4,362,014 12/1982 Driver et al. ..................... 60/39.43
4,509,324 4/1985 Urbach et al. ................... 60/39.17

FOREIGN PATENT DOCUMENTS 2818543 10/1979 Fed. Rep. of Germany .
1540057 2/1979 United Kingdom .
2010401 6/1979 United Kingdom .
2039328 6/1980 United Kingdom .

Primary Examiner—Stephen F. Husar
Attorney, Agent, or Firm—William R. Hinds

[57] ABSTRACT

A heat transfer system has a rotary machine 22 with compressor and expander regions and gas is first compressed in machine 22, passes through heat exchanger 23, is heated in combustor 24, then expands in machine 22, then passes through heat exchanger 23 to heat the gas, then passes through heat exchanger 107 to heat fluid in line 108. The machine 22 drives a heat pump 110 to heat fluid in line 111. Arrangements having two rotary machines are also described. A rotary machine has a rotor eccentrically mounted in a casing having axial end parts and a circumferential part and with vanes defining compartments with the casing and providing a compression region and an expansion region, valve means in the circumferential part adjacent the upstream edge of the outlet from one or both of the regions and responsive to pressure in the adjacent compartment to reduce or avoid excess pressure in the compression region or suction in the expansion region. A rotary machine has a rotor eccentrically mounted in a casing with vanes defining compartments with the casing and providing a compression region and expansion region, in which the rotor has axial parts between which the vanes are located, the axial parts comprising inner and outer parts defining an internal recess.

7 Claims, 15 Drawing Sheets

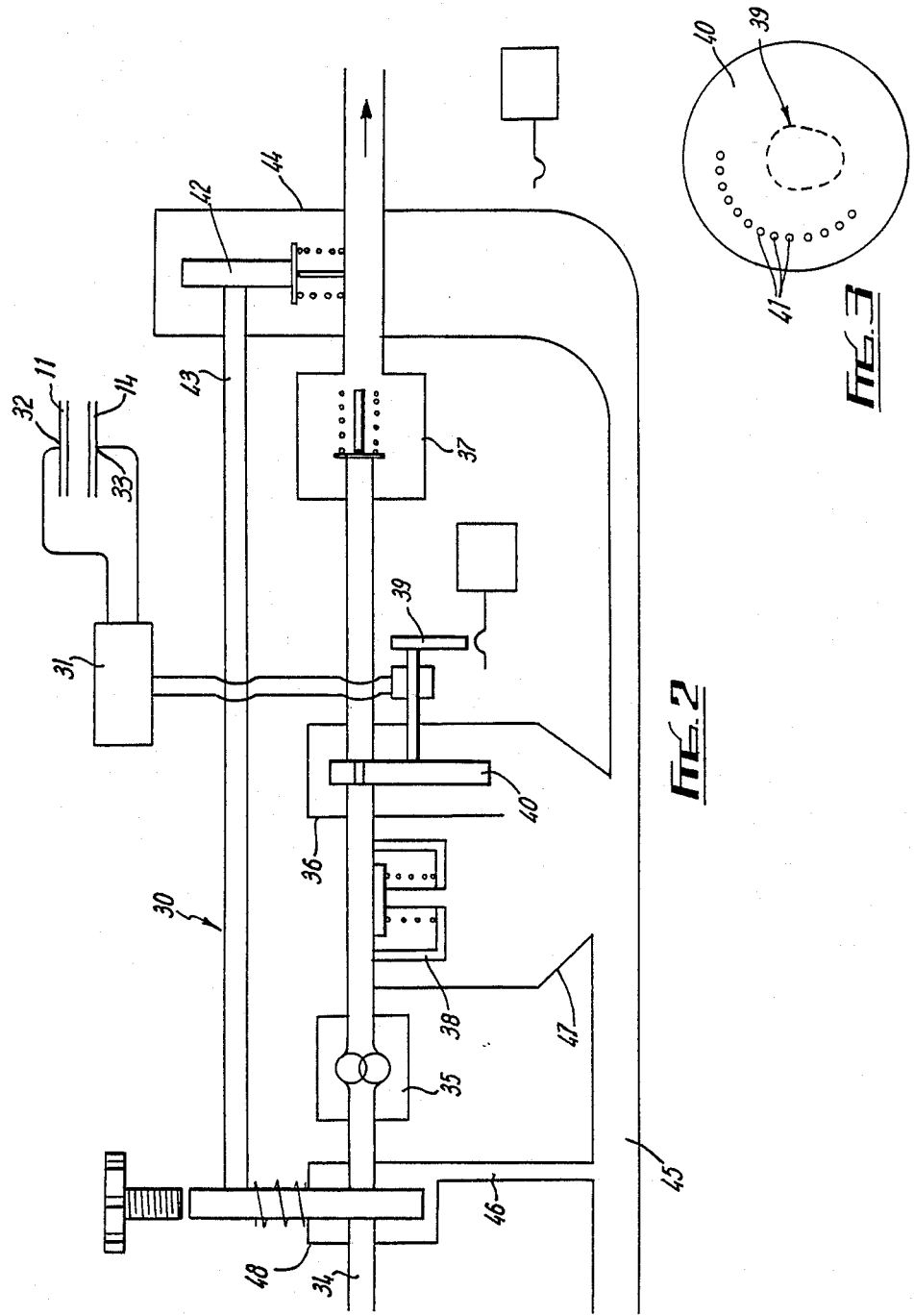

HEAT TRANSFER SYSTEMS

This invention relates to heat transfer systems and rotary machines.

According to the invention a heat transfer system comprises:
a fluid flow line,
a first heat exchanger in the fluid flow line,
a second heat exchanger,
a rotary machine having compressor and expander regions,
a heater for heating gas,
a flow conduit for flow of gas for compression in the rotary machine, then flow through the second heat exchanger to heat the gas, then flow through the heater, then through the expander region of the rotary machine, and then through the second heat exchanger to effect heating of the gas flow, then through the first heat exchanger to heat the fluid.

The rotary machine may be connected to drive a heat pump for heating fluid.

One form of system may have a further rotary machine having compressor and expander regions, the flow of gas being for compression in the further rotary machine before compression in the first-mentioned rotary machine, the gas passing from the second heat exchanger to the expander region of the further rotary machine and then to the first heat exchanger.

The further rotary machine may be connected to drive a heat pump for heating fluid.

Another form of system may have a further rotary machine having compressor and expander regions, the flow of gas being compression in the further rotary machine, then flow through a third heat exchanger in the fluid flow line to heat the fluid, then compression in the first-mentioned rotary machine, then through the second heat exchanger to heat the gas, then through the heater, then through the expander region of the first rotary machine, then through the second heat exchanger to heat the gas, then through the first heat exchanger to heat the fluid, then through the expander region of the further rotary machine.

The first and third heat exchangers may be in parallel.

The heater may be a combustor in which the gas is heated by combustion with fuel.

The system may include a control system including devices responsive to temperature in the fluid flow line upstream and downstream of the first and third heat exchangers for increasing or decreasing fuel flow.

The arrangement may be such that the temperature of the heated fluid is within upper and lower limits.

From another aspect the invention provides a rotary machine having a rotor eccentrically mounted in a casing having axial end parts and a circumferential part and with vanes defining compartments with the casing and providing a compression region and an expansion region, valve means in the circumferential part adjacent the upstream edge of the outlet from one or both of the regions and responsive to pressure in the adjacent compartment to reduce or avoid excess pressure in the compression region or suction in the expansion region.

The rotary machine may have valve means in the circumferential part adjacent the downstream edge of the inlet of the compression region and responsive to pressure in the adjacent compartment to reduce or avoid suction in the expansion region.

From a further aspect the invention provides a rotary machine having a rotor eccentrically mounted in a casing with vanes defining compartments with the casing and providing a compression region and expansion region, in which the rotor has axial parts between which the vanes are located, the axial parts comprising inner and outer parts defining an internal recess.

British Patent Specification No. 2039328 describes a power system and British Patent Specification No. 2010401 and U.S. Pat. Specification No. 4362014 describes rotary machines and form a background to the present invention.

Figure 4:
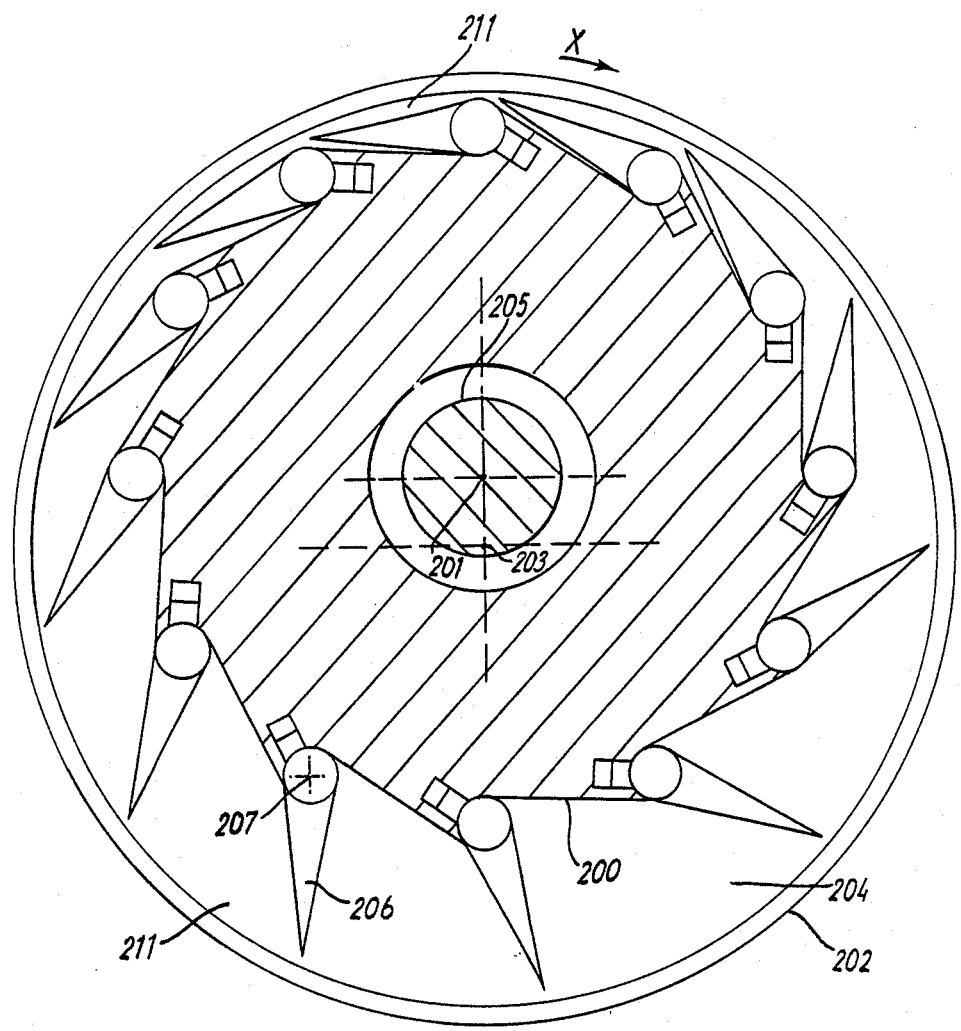
Figure 5:
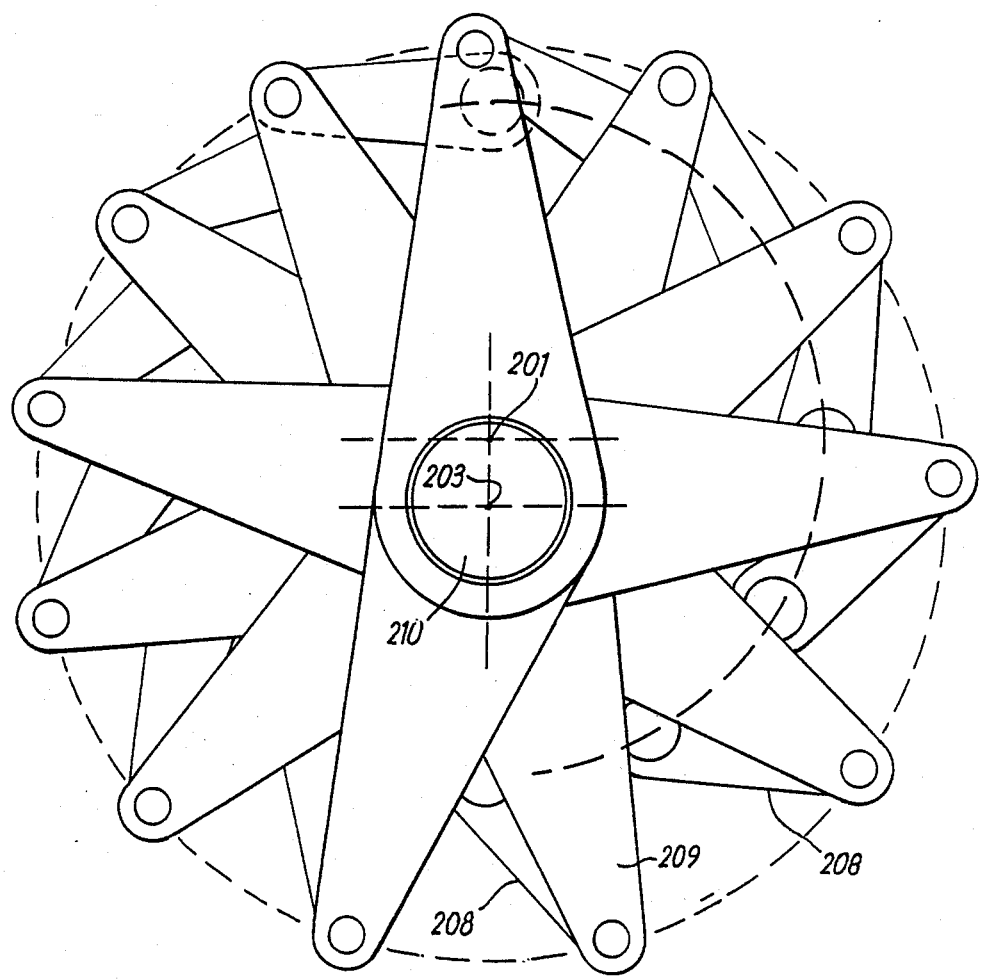
Figure 6:
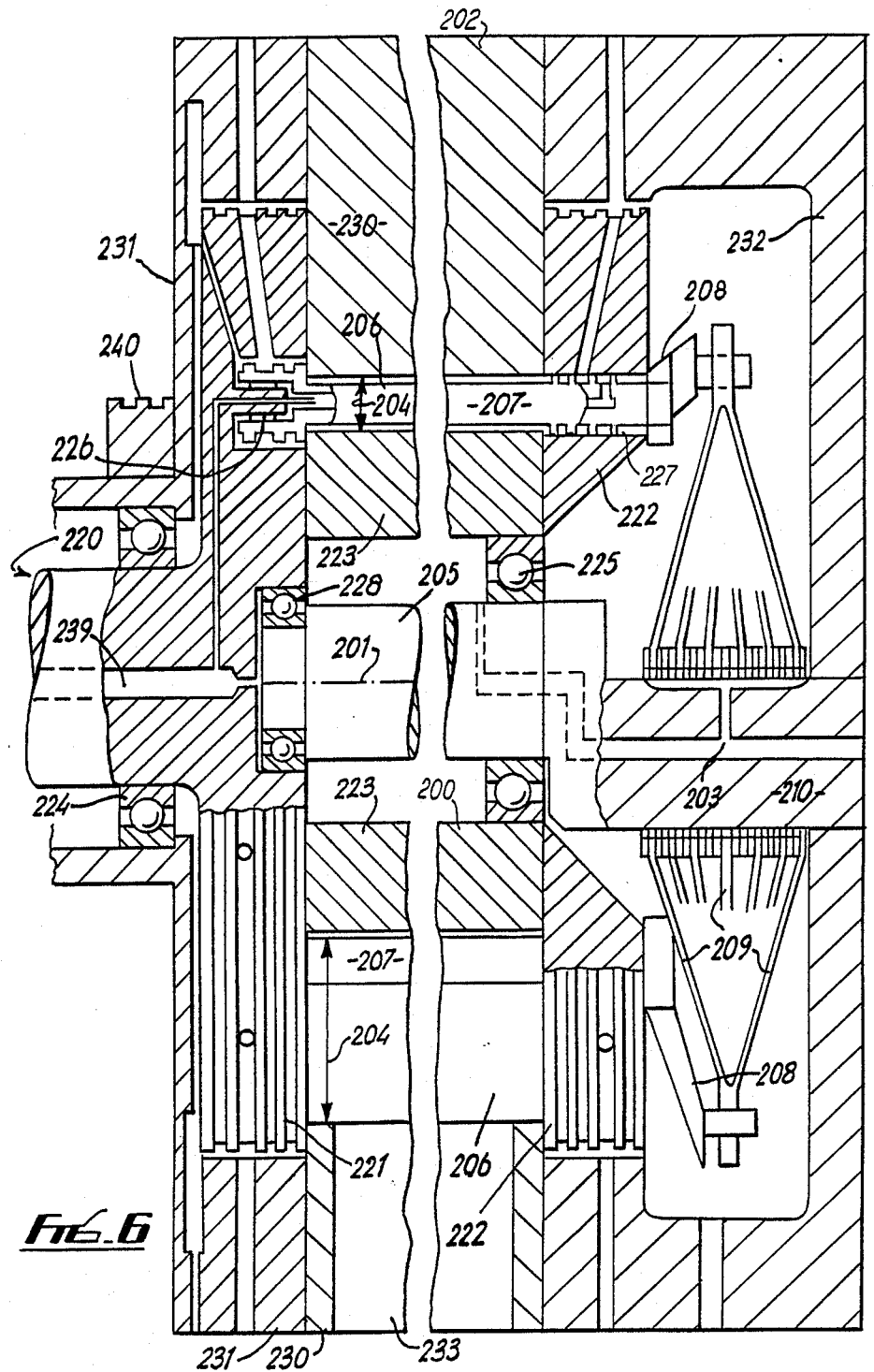
Figure 7:
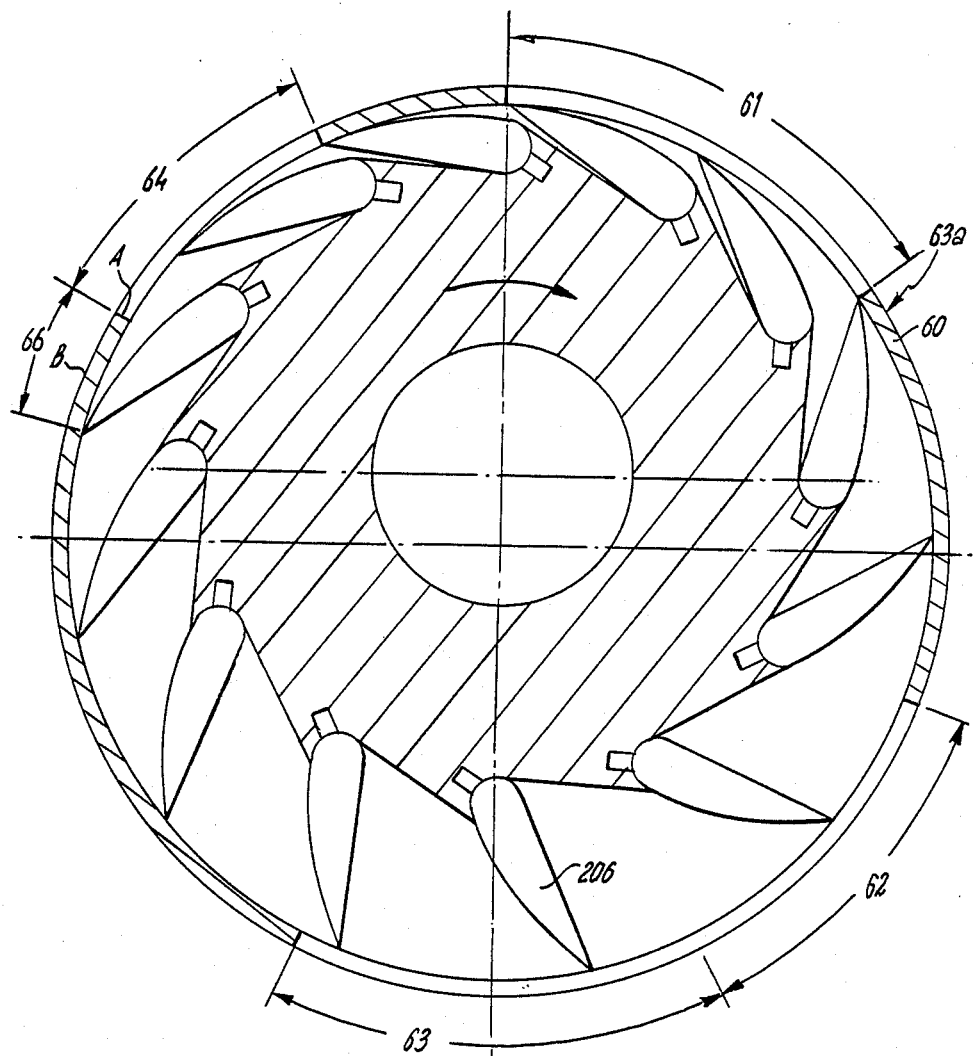
Figure 8:
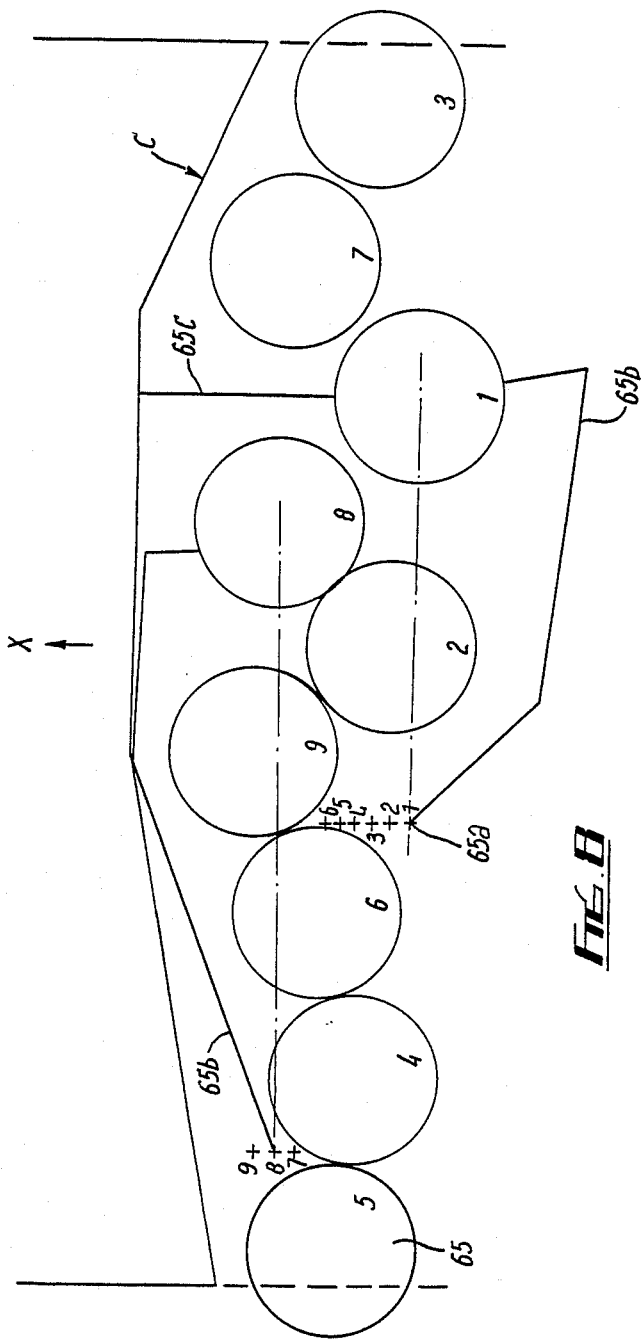
Figure 9:
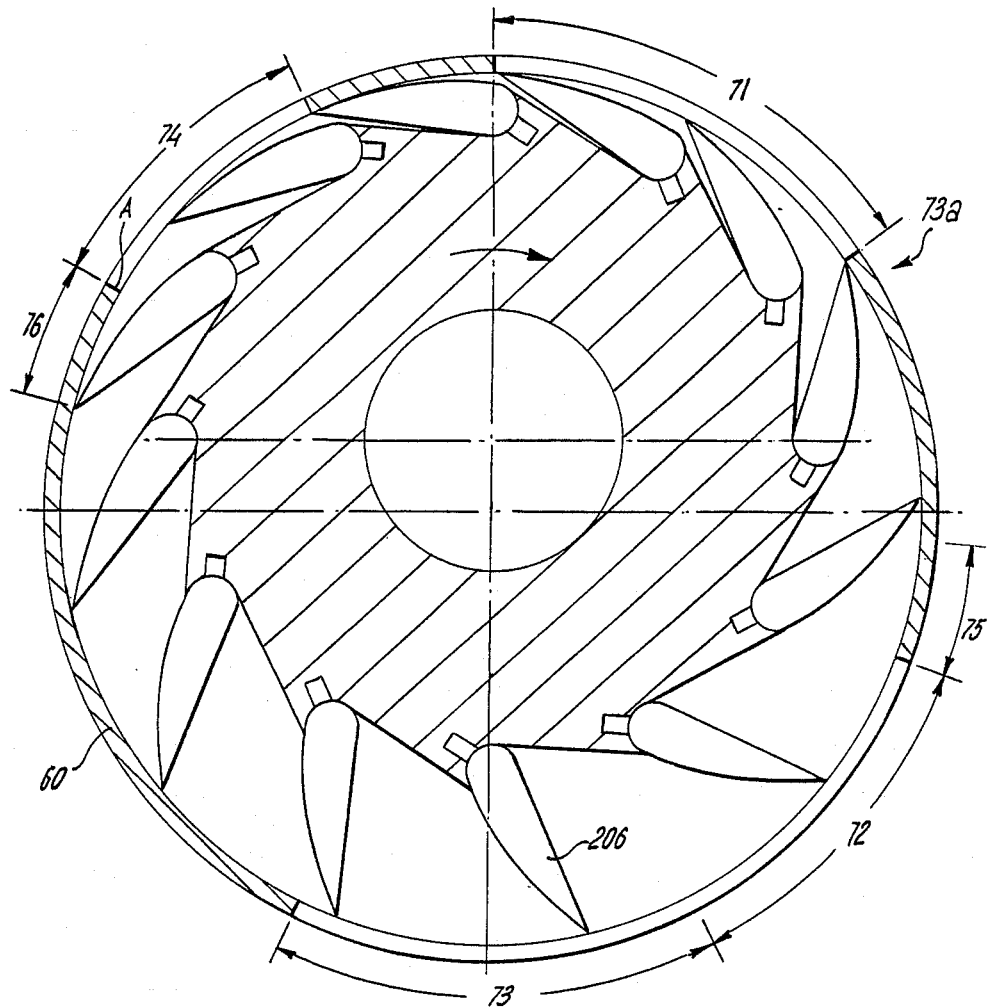
Figure 10:
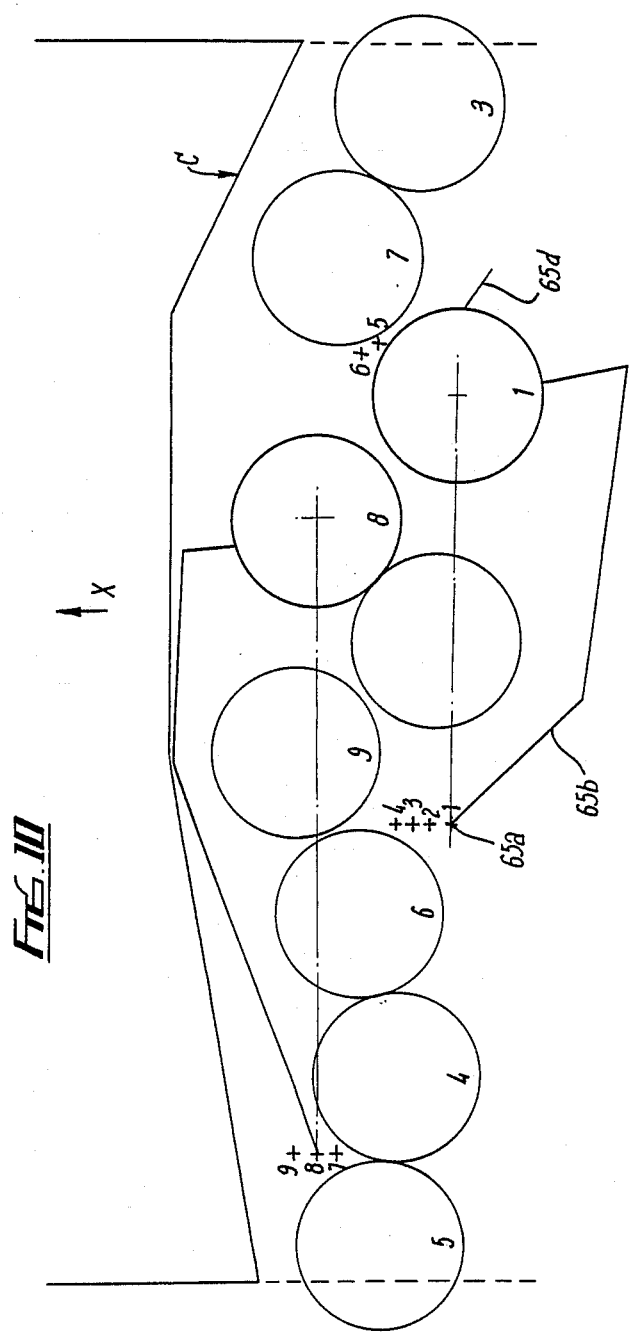
Figure 11:
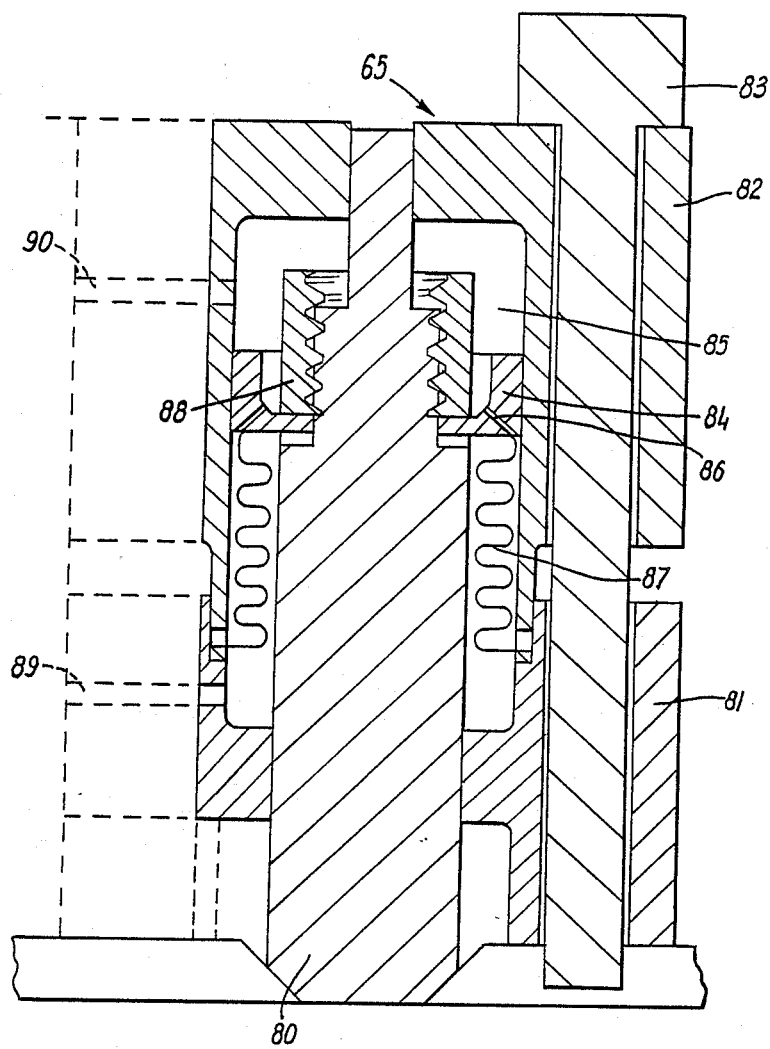
Figure 12:
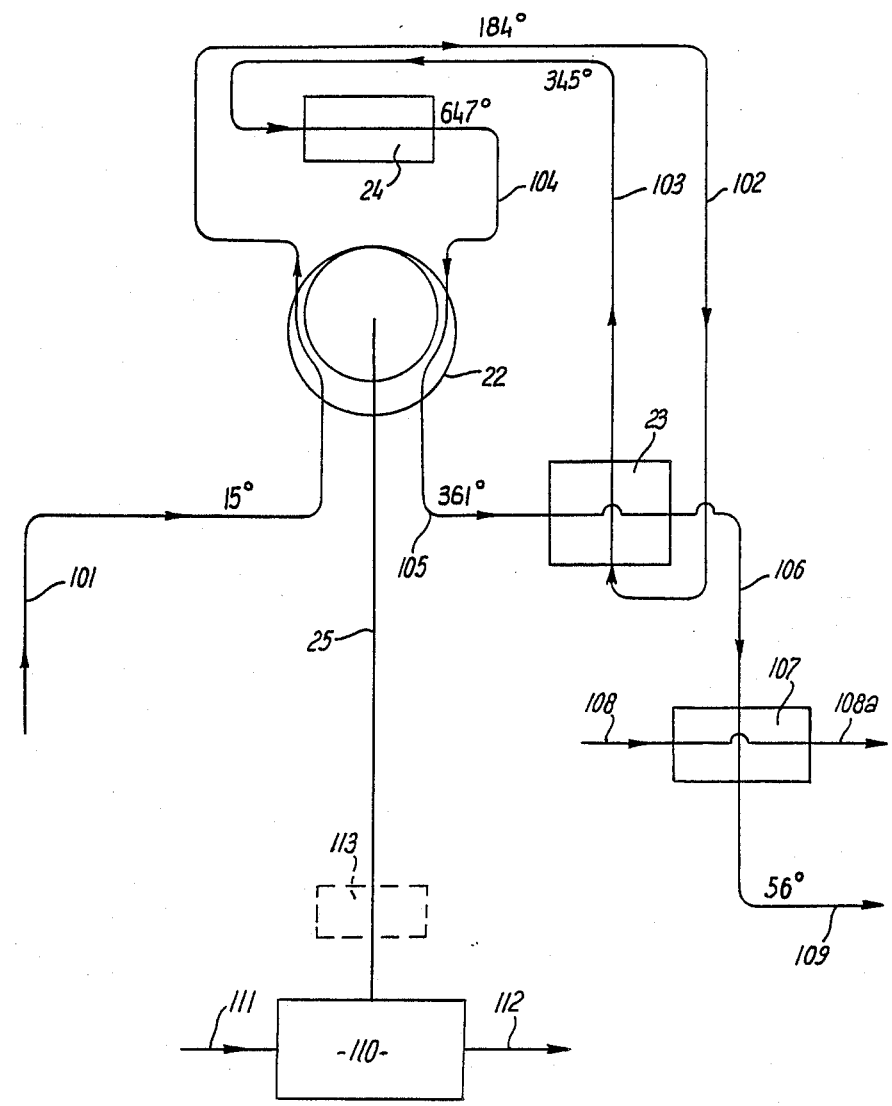
Figure 13:
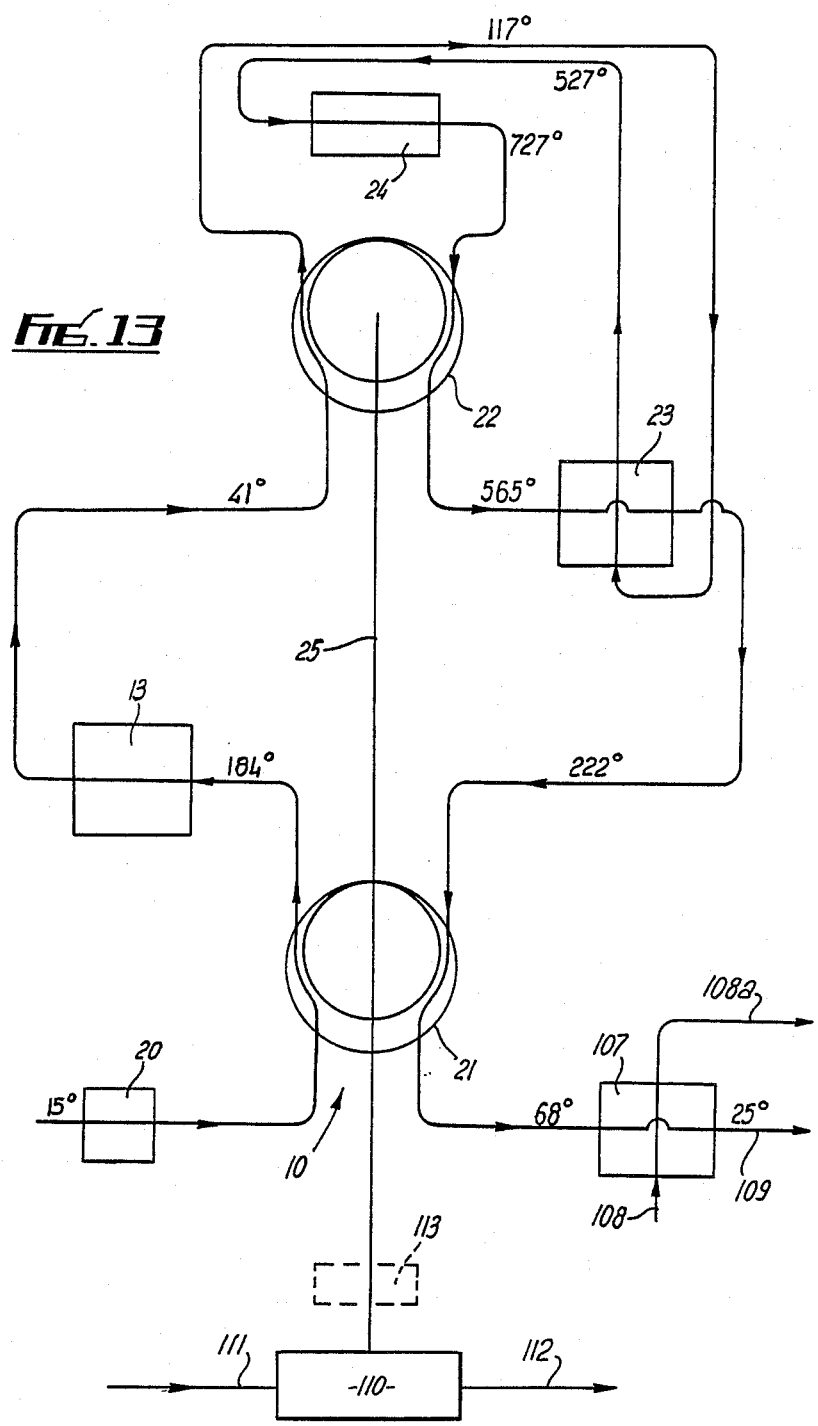
Figure 14:
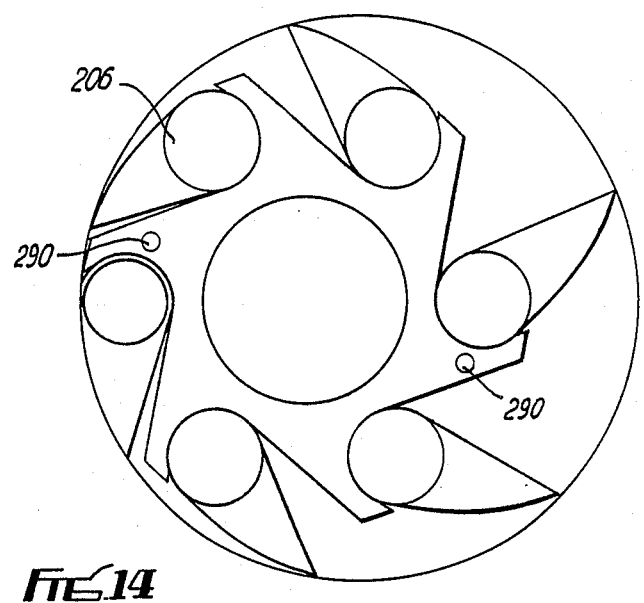
Figure 15:
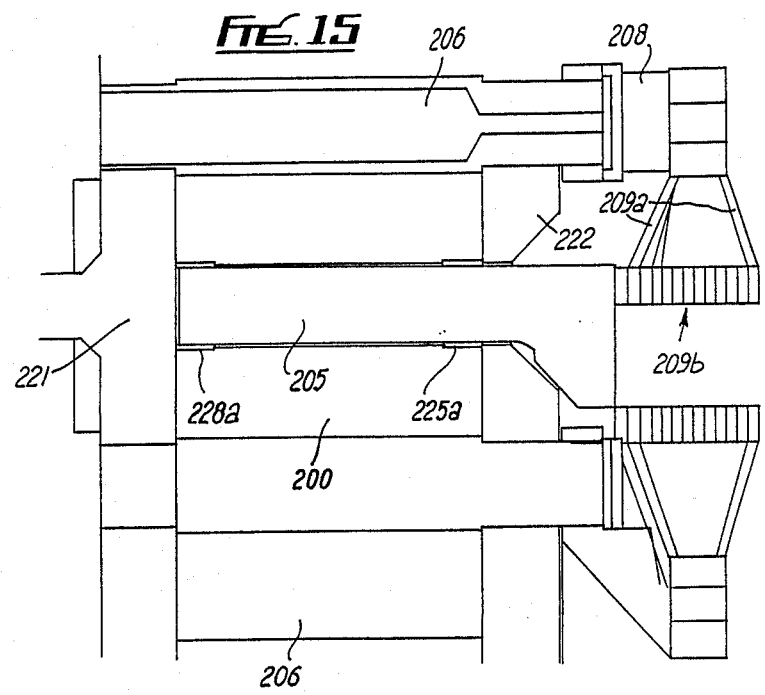
Figure 16:
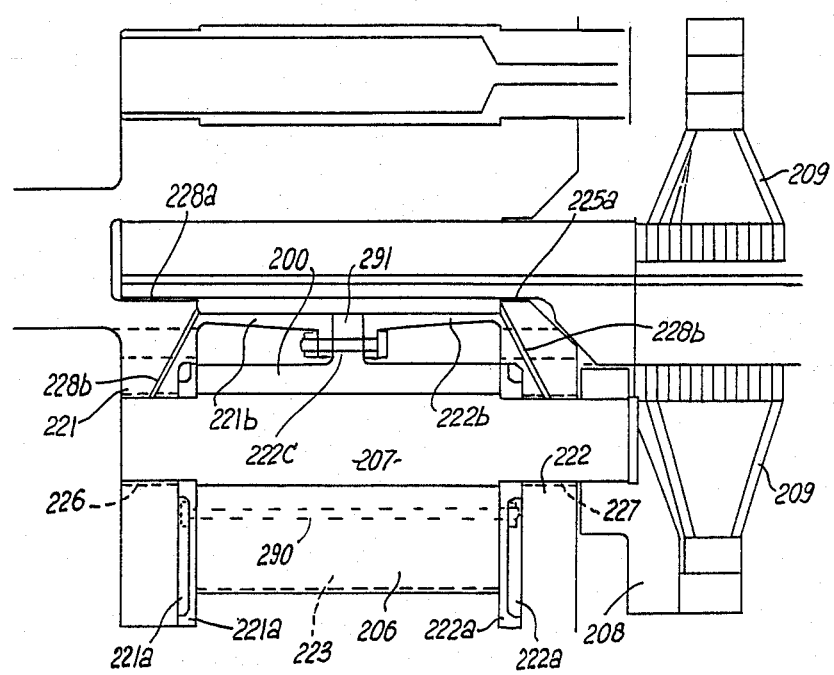
Figure 17:
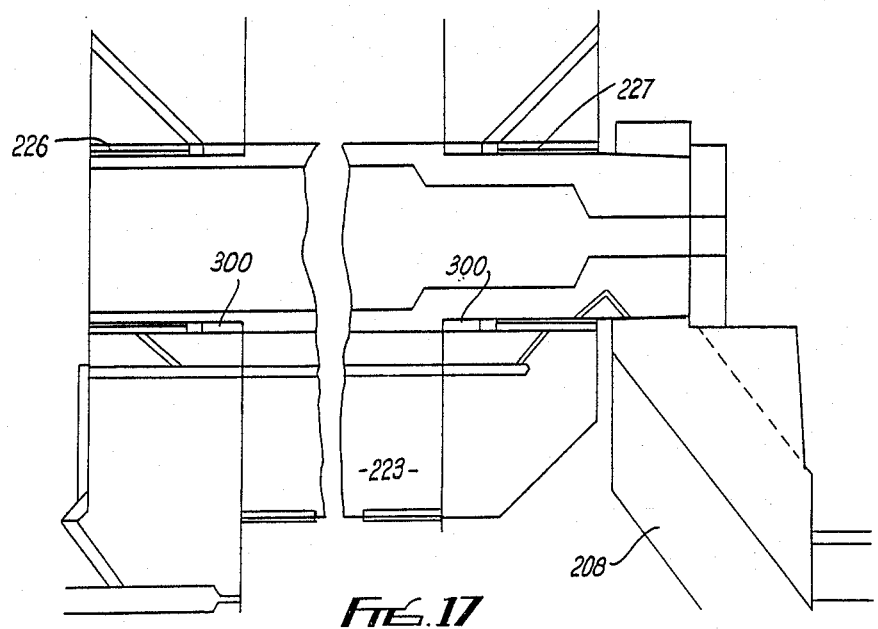
Figure 18:
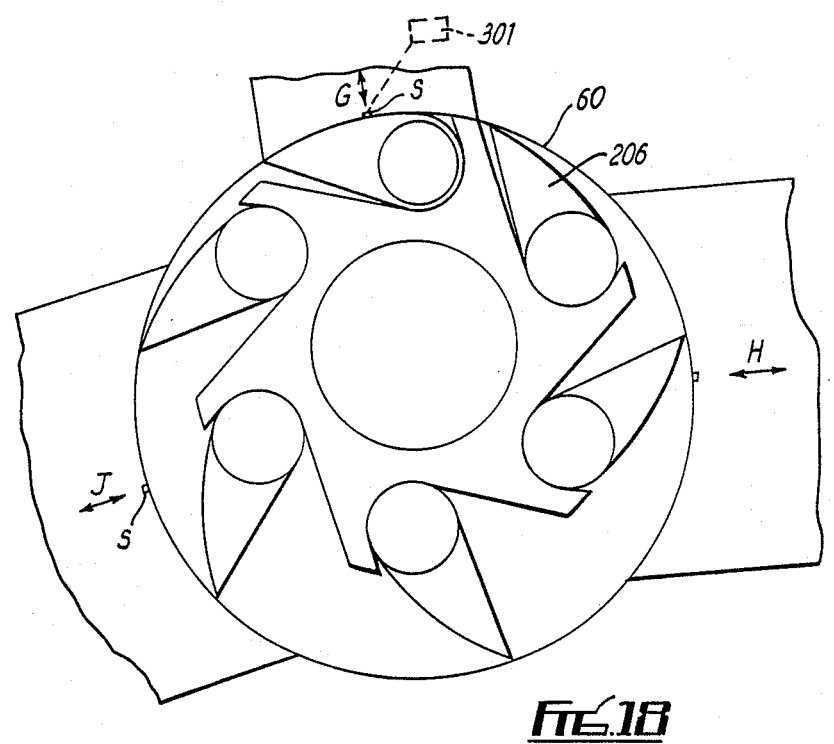
Figure 19:
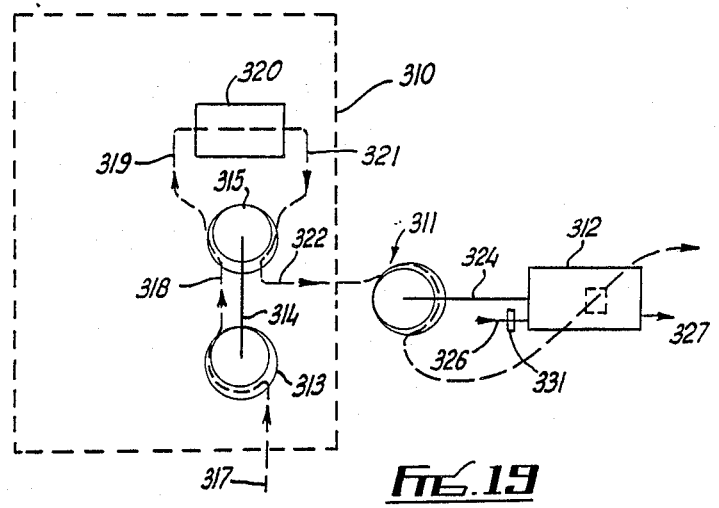

The invention may be performed in various ways and some specific embodiments with possible modifications will now be described by way of example with reference to the accompanying somewhat diagrammatic drawings, in which:

FIG. 1 shows a heat transfer system;
FIG. 2 is a control system;
FIG. 3 is a view of a valve member;
FIG. 4 is a representation of a rotor of a rotary machine;
FIG. 5 is a mechanical coupling for driving vanes;
FIG. 6 is a sectional side view of part of a device using the rotor of FIG. 3;
FIG. 7 shows a rotor;
FIG. 8 shows porting for the rotor of FIG. 7;
FIG. 9 shows another rotor;
FIG. 10 shows porting for the rotor of FIG. 9;
FIG. 11 is a section through a valve;
FIG. 12 shows another heat transfer system;
FIG. 13 shows a further heat transfer system;
FIG. 14 shows a modified vane arrangement;
FIG. 15 shows a modified rotor;
FIG. 16 shows a further rotor;
FIG. 17 shows another modification;
FIG. 18 shows another rotor; and
FIG. 19 shows a heating circuit.

A fluid heating system 10 is shown schematically in FIG. 1. A fluid, which could be a liquid or a gas, to be heated is fed on feed line or pipe 11 and part of the flow goes on line 12 through heat exchanger 13 and then to a return line 14 and the remainder of the flow goes on line 15 through heat exchanger 16 and then to the return line 14. Means indicated at 17 in line 12 may be provided for varying the relative proportion of the flow in line 11 which goes through the respective heat exchangers 13, 16. In passing through each of the heat exchangers 13, 16 the fluid is heated and receives heat from a flow of gas, for example air or other combustible gas.

Flow of gas is as indicated by arrows in FIG. 1. The gas passes first through a fan 20 to increase the speed of flow, then through a low pressure compression stage in a rotary compressor/expander machine 21 from which it emerges at a higher pressure (e.g. 65 pounds per square inch absolute (PSIA) (4 bars) and (e.g. 184° C.) temperature to flow through heat exchanger 13 from which the now-cooler gas flows to a second, high-pressure, rotary compressor/expander machine 22 from which the gas emerges at a higher temperature and pressure (e.g. 130 PSIA) (8 bars). The gas then flows through a heat exchanger 23, where the gas is heated, then through a combustor 24 in which the gas is heated by combustion with fuel, and then flows through an expander part of compressor/expander machine 22 where the gas loses heat and pressure and drives the machine 22, emerging from the machine at a pressure for example 65 PSIA (4 bars). The gas then flows through heat exchanger 23 in which the gas is cooled, giving up heat to the gas flowing to combustor 24. The now-cooler gas then flows through heat exchanger 16 where the gas gives up heat to the fluid in line 15 and, further cooled, the gas passes to an expander part of machine 21 where the gas expands (for example to atmospheric pressure) and cools, driving the machine 21. Examples of gas temperature in ° Celsius are indicated on FIG. 1 and it will be noted the gas temperature leaving the expander part of machine 21 is below the freezing point of water so that the gas could pass to a device where it acts as a coolant. The rotary machines 21, 22 are coupled for synchronous rotation as indicated schematically at 25. The heated fluid in line 14 may for example be used to heat domestic or industrial radiators.

A control system 30 for the heating system 10 is shown in FIG. 2, for use with liquid fuel in combustor 24. A similar control system could be used for gaseous fuel.

A control unit 31 is linked to temperature responsive sensors 32, 33 associated with the feed and return lines 11, 14. Fuel from a supply tank (not shown) is drawn on pipe 34 by a pump 35 and passes through a metering valve 36 and a pressurizing valve 37 to the burner or combustor 24. A pressure relief valve 38 is connected to the pipe 34 between the pump and the metering valve. A valve member 40 of valve 36 is connected for rotation with a cam 39. The member 40 has a series of angularly spaced orifices 41 of different sizes which can be selectively placed in the flow in pipe 34. When the temperature of fluid in the line 11 falls, for example, to 21° C. the unit 31 rotates valve member 40 so that a larger orifice, or more orifices, are brought into pipe 34, to increase fuel flow. The valve member 40 continues to rotate until the temperature in the feed line reaches 25° C. or the temperature in the return line reaches 85° C. If the feed line 11 reaches 27° C. or the return line reaches 87° C., the unit 31 moves the valve member 40 to close the pipe 34 until the temperature in the feed line is 25° C. and the temperature in the return line is 85° C. or less.

A shut-off valve 48, which may be manually or electrically operated, is provided so that when operated the pipe 34 is closed and a cam 42 is operated through a shaft 43 to open a dump valve 44 connecting the pipe 34 to a drain pipe 45 leading to the supply tank. The pipe 45 also receives any leakage from valves 36, 38, 48 through connections 46, 47.

The machines 21, 22 are rotary machines of the kind comprising:

(a) a casing;

(b) a rotor rotatable eccentrically in, or with one part of, the casing and having means to define with, or with another part of, the casing, peripheral compartments which are separate from each other;

(c) an inlet for the inflow of a medium to the compartments sequentially as the rotor rotates;

(d) an outlet, displaced in the direction of rotation of the rotor from the inlet, for the outflow of said medium, and (e) a shaft whereby power can be supplied to or taken from said rotor.

Such machines can be adapted to perform either an engine function by allowing a hot inlet gas to expand in the compartments as the compartments increase in volume or a compressor function by supplying an inlet gas to be compressed in the compartments as the compartments decrease in volume. The machines may have radially slidable vanes but preferably are as described in British Pat. No. 2010401 and U.S. Pat. No. 4,362,014 with some modifications described hereinafter. In general such a machine comprises:

(a) a casing;

(b) a rotor rotatable eccentrically in the casing to define an eccentric annulus and having vanes pivotably secured to the periphery of the rotor to define with the casing compartments in the eccentric annulus which are separate from each other;

(c) an inlet opening for the inflow of a medium to the compartments sequentially as the rotor rotates;

(d) an outlet, displaced in the direction of rotation of the rotor from the inlet, for the outflow of said medium;

(e) a coupling whereby power can be supplied to or taken from said rotor;

(f) crank arms movable in planes parallel to but displaced from the planes occupied by the vanes and oscillating arms rotatably oscillatable about a pillar which is fixed in relation to the casing, the oscillating arms being secured to the crank arms to mechanically pivot the crank arms and hence the vanes to their operative positions. Referring to FIGS. 4 to 6, in FIG. 4 there is shown a rotary engine having an engine rotor 200 with an axis 201 and a fixed truly cylindrical casing 202 with axis 203. The rotor 200 is seen to be eccentric in the casing 202 and defines with the casing an eccentric annulus 204. The rotor is rotatable on a static axle 205 and is equipped with twelve angularly spaced vanes 206 carried on pivots, indicated by axes 207, and running in the casing with a very small clearance between their tips and the casing. The vanes 206 are each respectively mechanically coupled to cranks 208 (now see FIG. 5) and the cranks are oscillated by respective connecting arms 209 mounted on a casing pillar 210, that is, about axis 203. The vanes define peripheral compartments 211 in the eccentric annulus which cyclically change in volume as rotor rotates. The rotor is arranged for rotation in the direction of arrow x. The outer surface of the vanes 206 could be curved so that when the compartments have smallest volume this surface substantially conforms to the inner surface of the casing and has a running clearance therewith.

Components 200 to 210 are also indicated in FIG. 6 which will now be described.

The main static parts of the engine comprise the casing 202; casing pillar 210 with axis 203; and static axle 205 with axis 201.

The main rotating parts of the engine comprise the rotor 200 which has a saw-tooth periphery and is rotatable about axis 201 of axle 205; vanes 206, rotatable about axes 207 at the roots of the saw teeth; cranks 208; and connecting arms 209. As shown in FIG. 6 the vanes 206 substantially fully radially occupy the eccentric annulus 204 (indicated by "dimension" lines 204).

Other parts of the rotor are: an input or output shaft 220 integral with a sealing, bearing and lubricating front plate 221 and rear plate 222. Between the plates 221, 222 there is the main body 223 (200) of the rotor. The rotor is carried on bearings 224, 225, 228 and the vanes 206 are supported on bearings 226, 227, in the plates 221, 222.

Other parts of the casing are: the main block 230, the front cover plate 231 and rear cover plate 232. The block 230 defines a radial exhaust port 233. The form and location of inlet ports will be determined by the function the machine has to perform.

Oil passages 239 are indicated.

The expansion of the supplied gas typically takes place in the peripheral compartments 211 as they increase in volume and once they are beyond the supply cut-off point. This expansion applies a driving torque to the shaft 220. As the compartments 211 change in volume, the expanded gas is exposed to an exhaust port 233 which may typically angularly extend over about 5/12 of the circumference.

FIG. 7 illustrates machine 21 having casing 60 with expansion inlet region 61, expansion exhaust port region 62, compressor inlet region 63, and compressor outlet region 64. At maximum design power and fuel consumption the vane tip will have reached point A at the point of maximum compression. If fuel supply is now reduced or there is a change in working efficiency, the vane will reach the angular point of appropriate compression before point A, e.g. point B, and to avoid overpressure being obtained as a result of rotation from B to A, valves are provided, responsive to pressure in the adjacent compartment. The valves control ports in region 66 of the casing. There are typically nine valves 65 giving a nine-step adjustment and they are located as shown in FIG. 8 indicating the edge C of the exhaust port.

Each valve is associated with a respective sensor 65a for the compartment pressure at the circumferential position of the valve and connected to the pressure tapping described later. The connection is indicated schematically at 65b for valves 1, 8 but omitted for the other valves for clarity. The valves overlap so that the angular extent of any overpressurizing is reduced or eliminated. Over-pressurizing should preferably be of angular extent of no more than a half valve diameter.

The sensors 65a are located in the circumferential part of the casing and may comprise a hollow tube communicating at an inner end with an aperture in the casing and at an outer end with connection 65b. Region 66 is immediately upstream of the upstream edge of the outlet 64 from the compression region.

Similarly in the case of machine 22 there is an expansion inlet region 71 FIG. 9, expansion exhaust port region 72, compressor inlet region 73, compressor outlet region 74. Valves 65 are located in region 75, to avoid suction in the expansion stage, and in region 76, to avoid over-pressure in the compression stage, with typical locations of the valve ports in region 76 shown in FIG. 10. There may typically be nine valves 65 in region 75.

It is preferable to have valves 65 also immediately downstream of the inlet regions 61, 71 in casing regions 63a, 73a. This enables the acceleration of the rotor to be increased by increasing the drive torque as a result of admitting more gas into the inlet region via the valves.

A suitable valve 65 is shown in FIG. 11. The valve has a stem 80 for closing the respective port, and inner and outer parts 81, 82 secured together by bolt 83. A piston 84 is slidable in chamber 85 in part 82 and has a through vent 86 and is connected to bellows seal 87, being held in place on stem 80 by nut 88. Pressure tappings 89, 90 communicate with opposite sides of the piston.

The compressors and expanders automatically compensate for changes brought about by the fuel control system or a change in their working efficiency in the following way:

The low pressure compressor anti-overpressurisation valves are spring loaded closed by their bellows, the inner-most pressure tapping 89 is used to sense the pressure inside the machine annulus (i.e. the adjacent compartment) and the outer pressure tapping 90 is connected on line 65c to the high pressure expansion exhaust outlet.

The high pressure compressor anti-overpressurisation valves are spring loaded closed by their bellows, the inner-most pressure tapping is used to sense the pressure inside the machine annulus. The outer-most tapping is connected to combustion pressure, at combustor inlet 24a.

The high pressure expansion exhaust anti-suction valves are spring-loaded open by their bellows, the outer-most pressure tapping is used to sense the pressure inside the machine annulus. The inner-most pressure tapping is connected to the high pressure expansion exhaust outlet on line 65c.

If desired there may be similar anti-suction valves immediately upstream of the low pressure exhaust opening.

With the described machine the heat output is greater than the heat input of the fuel, some of the heat in the output being taken from atmosphere.

The described arrangement provides a heat pump system. With exhaust temperatures of for example 205° K. (about - 70° C.) a volume of about 1/10 of the volume heated by the heated fluid can be cooled to deep freeze temperatures.

FIG. 12 shows another heat transfer system 100 in which like parts to FIGS. 1–11 have like numerals.

In this case there is one rotary machine 22 receiving gas input flow on line 101 which after being compressed and heated in machine 22 is fed on line 102 through heat exchanger 23, in which the gas is further heated, and thence on line 103 to combustor 24 where the gas is further heated and then on line 104 to the expander side of the machine 22, then at reduced temperature and pressure on line 105 through heat exchanger 23 where the gas is cooled and then passes on line 106 to a heat exchanger 107 where the gas transfers heat to a fluid (liquid or gas) in line 108 the heated fluid being available on line 108a for example for domestic or industrial radiators. The gas passes to exhaust on line 109.

The machine 22 is arranged to drive by shaft 25a heat pump 110 which receives fluid to be heated (liquid or gas) on line 111 and discharges heated fluid on line 112, the heated fluid being available for example for heating.

Instead of shaft 25 driving the heat pump 110 direct, the shaft 25 may drive an electric generator 113 which in turn drives the heat pump 110.

In FIG. 13 the system has two rotary machines 21, 22 and heated fluid is again available on lines 108a and 112.

The number of vanes and associated parts in the rotary machines may vary and would typically be six or more. For example as shown in FIG. 14 there could be six vanes 206. Preferably the outer surface 206a of the vanes is shaped to conform to the inner surface of the casing with running clearance. It is desirable to have as large a number of vanes as convenient and practical.

FIG. 15 shows a longitudinal section through a modified rotor, vane, drive arm and spokes in which the rotor 200 is mounted in plain bearings 225a, 228a. There are two arms 209 for each vane e.g. at 209a, connected to the rotor as indicated, one having a central connection at 209b of double thickness.

FIG. 16 shows another arrangement allowing higher operating temperatures, for example as appropriate for use as an internal combustion engine rather than as a compressor. In this arrangement additional annular side discs 221a, 222a providing annular recesses 221d, 222d are secured to the sides of the rotor and bolted thereto by a tie bolt 290 (see also FIG. 14). The outer parts 221, 222 of of the side discs have inner extensions 221b, 222b bolted to each other and to radial inner tongue 291 of rotor 200 at 222c. The higher temperatures (e.g.400° C.) appropriate for use as an internal combustion engine might preclude oil lubrication of the hot rotor but by splitting the side discs in this way with recesses 221d, 222d and limited area of contact between inner and outer discs the axially outer side discs 221, 222 although rotating with the rotor remain sufficiently cool for oil lubrication of bearings 225a, 228a as indicated at 228b.

Preferably thrust bearings 300 are provided (FIG. 17) to resist axial movement of vanes and maintain a running clearance between the side of the vanes and the side discs 221, 222, or 221a, 222a.

FIG. 18 shows a modified rotor for use as part of a combustion engine. When the rotor is used as part of a combustion engine the rotor will run at temperatures greater than 400° C. and the casing temperature will vary circumferentially. The casing needs to be controlled by locally cooling or locally moving to maintain a running clearance of typically less than 0.05 mm on smaller engines and 0.2 mm on larger engines. This sort of problem is usually solved by varying the air flow round the casing and hence varying the cooling effect, but in the present case because the casing outside the rotor path is divided by the inlet and outlet ports it is possible to have radially adjustable segments of the rotor path. The radial position of the segments can be controlled by proximity sensors with the segments sliding against fixed parts of the casing. Movement of rotor path segments G, H and J is ±0.5 mm in direction of arrows. Electronic sensors S control actuators to position the segments in close proximity to the rotating vane tips. Actuators 301 (only one shown) e.g. stepper motors can move casing segments through gearing.

FIG. 19 shows a further arrangement. A gas generator 310 drives a heat pump drive unit 311 which drives a heat pump 312. The gas generator 310 comprises a rotary machine 313 acting as a low pressure compressor mechanically coupled at 314 to rotate with a rotary machine 315 arranged as a high pressure compressor/expander. Air or other combustible gas inlet 317 to the machine 313 enables the pressure and temperature of the gas to be increased and the gas passes on line 318 to the compression side of machine 315 where the temperature and pressure of the gas is increased. The gas then passes on line 319 to a gas combustor 320 in which the gas is heated to for example between 500° C. and 1000° C. by burning with fuel and the hot gases of combustion then pass on line 321 to the expander part of machine 315 where the gas pressure and temperature are reduced as the gas drives the machine 315 and thus the machine 313. The gas pressure reduces in machine 315 approximately to the outlet pressure of machine 313. The gas then passes on line 322 to a rotary machine 311 mechanically coupled at 324 to drive a heat pump 312 having fluid input 326 and heated fluid output 327. The gas expands in machine 311 to drive the machine 311. The gas exhausted from machine 311 may pass to atmosphere or may be used to assist in heating the refrigerant medium in a heat exchanger 330 in the heat pump at the appropriate point in the refrigerant medium heating/cooling cycle.

The rotary machines are as described above.

Under operating conditions the fluid temperature in inlet 326 may vary, for example in consequence of changes in ambient temperature e.g. in a domestic heating system. As a consequence the power requirements of the heat pump drive unit will also alter and this alters the following:

(a) The fuel flow to the gas generator combustion chamber 320 and/or (b) the delivery pressure from the gas generator HP compressor 315 and/or (c) the outlet pressure from the gas generator turbine 305.

The effect of (a) and/or (b) and/or (c) is to vary the combustor 320 pressure and temperature.

Sensors 331 in line 326 may control the fuel flow to the combustor to for example maintain a constant temperature in outlet 327.Varying the fuel flow will vary the delivery pressure from machine 315; this can be separately varied by adjusting sensors 65a or valves 65 to vary the expansion or compressor outlet pressure at which the valves operate.

The combustor 320, 24 can be replaced by a heat exchanger receiving heat from a suitable source.

I claim

1. A heat transfer system comprising:
   a fluid flow line,
   a first heat exchanger in the fluid flow line,
   a second heat exchanger,
   a rotary machine having compressor and expander regions,
   a heater for heating gas,
   a further rotary machine having compressor and expander region,
   a flow conduit for flow of gas for compression in the further rotary machine, then compression in the first-mentioned rotary machine, then flow through the second heat exchanger to heat the gas, then flow through the heater, then through the expander region of the first-mentioned rotary machine, and then through the second heat exchanger to effect heating of the gas flow, then through the expander region of the further rotary machine, then through the first heat exchanger to heat the fluid.

2. A system as claimed in claim 1, in which the further rotary machine is connected to drive a heat pump.

3. A heat transfer system comprising:
   a fluid flow line,
   a first heat exchanger in the fluid flow line,
   a second heat exchanger,
   a rotary machine having compressor and expander regions,
   a heater for heating gas,
   a further rotary machine having compressor and expander regions,
   a flow conduit for flow of gas, the gas flow sequence being compression in the further rotary machine, then flow through a third heat exchanger in the fluid flow line to heat the fluid, then compression in the first-mentioned rotary machine, then through the second heat exchanger to heat the gas, then through the heater, then through the expander region of the first-mentioned rotary machine, then through the second heat exchanger to heat the gas, then through the first heat exchanger to heat the fluid, then through the expander region of the further rotary machine.

4. A system as claimed in claim 3, in which the first and third heat exchangers are in parallel.

5. A system as claimed in claim 3 having a control system including devices responsive to temperature in the fluid flow line upstream and downstream of the first and third heat exchangers for increasing or decreasing fuel flow.

6. A system as claimed in claim 3, in which the rotary machine has a rotor eccentrically mounted in a casing with vanes defining compartments with the casing and providing a compression region and an expansion region, one or more valves adjacent the outlet from one or both of the regions and responsive to pressure in the adjacent compartment to reduce or avoid excess pressure in the compression region or suction in the expansion region.

7. A system as claimed in claim 3, in which the rotary machine and the further rotary machine each has a rotor eccentrically mounted in a casing with vanes defining compartments with the casing and providing a compression region and an expansion region, one or more valves adjacent the outlet from one or both of the regions and responsive to pressure in the adjacent compartment to reduce or avoid excess pressure in the compression region or suction in the expansion region.

* * * * *